United States Patent [19]

Chang

[11] Patent Number: 5,400,472
[45] Date of Patent: * Mar. 28, 1995

[54] HANDLE ASSEMBLY OF A BAGGGAGE CART

[76] Inventor: Fu J. Chang, 8-5 Fl., No. 191, Fu Hsing N. Rd., Taipei, Taiwan, Prov. of China

[*] Notice: The portion of the term of this patent subsequent to Nov. 29, 2011 has been disclaimed.

[21] Appl. No.: 102,003

[22] Filed: Aug. 4, 1993

[51] Int. Cl.$^6$ ............................................. B25G 1/04
[52] U.S. Cl. ..................................................... 16/115
[58] Field of Search .................... 16/115; 190/18 A; 403/109, 377; 280/47.315, 47.371, 655, 655.1

[56] References Cited

U.S. PATENT DOCUMENTS

| | | | |
|---|---|---|---|
| 3,811,455 | 5/1974 | Thur | 16/115 |
| 3,931,968 | 1/1976 | Hedberg | 16/115 |
| 4,314,624 | 2/1982 | Royet | 16/115 |
| 4,538,709 | 9/1985 | Williams et al. | 190/18 A |
| 4,586,406 | 5/1986 | Howard | 16/115 |
| 4,618,035 | 10/1986 | Mao | 190/18 A |

FOREIGN PATENT DOCUMENTS

| | | | |
|---|---|---|---|
| 168984 | 9/1934 | Switzerland | 403/108 |
| 639177 | 10/1983 | Switzerland | 403/109 |

*Primary Examiner*—P. Austin Bradley
*Assistant Examiner*—Chuck Y. Mah
*Attorney, Agent, or Firm*—McCubbrey, Bartels & Ward

[57] ABSTRACT

A length-adjustable handle assembly for a baggage cart integrated with a suitcase, includes a handle for gripping by a user, at least an outer tube fixedly connected to the suitcase and having a plurality of locking holes along its length, an inner tube fixedly secured to the handle and telescopically movable within the outer tube, an operating sleeve fixedly connected to the inner tube and having holes formed in its wall for receiving steel balls, an operating means movable between a first position and a second position in respective to the inner tubes, a plunger with a flange surface fixedly connected to the operating means and movable within the operating sleeve. When the operating means is operated to the first position, the flange surface of the plunger will contact the steel balls and force at least parts of them to fixedly engage with the holes of the outer tube when the holes of the operating sleeve are aligned with the holes of the outer tubes. When the operating means is operated to the second position, the fixed engagement between the steel balls and the holes of the outer tube is released.

2 Claims, 3 Drawing Sheets

HANDLE ASSEMBLY OF A BAGGGAGE CART

BACKGROUND OF THE INVENTION

Due to the upgrading of living standard and increasing business activity, more and more people have chances to travel. In order to enable these persons to carry their baggage, many ideas and devices have been developed. For example, a solution is proposed to equip a case itself with wheels. However, the moving direction of such a case is difficult to be con%rolled. Also, a foldable cart with a length-adjustable handle assembly has been proposed. Such a foldable cart indeed can effectively help the travelers in carrying their baggage. However, the travelers must additionally take the foldable carts with them. Although, the foldable carts presently are constructed of light-weight materials, for example, plastic or aluminum tubes, it still is an inconvenience for the travelers to carry extra equipment. In order to obviate the disadvantages of said conventional carts, a cart is proposed to combine the case and the cart integrally. (Such a cart hereafter is referred as a "baggage cart".) Such a baggage cart has a telescopic handle assembly which has outer tubes fixedly installed onto the case and inner tubes fixedly connected to a handle and slideably retained within the outer tubes respectively. When a traveler uses such a baggage cart to transport his baggage, he grips the handle with his hand(s) to draw the inner tubes from the outer tubes and then moves the baggage cart. Since the telescopic handle assembly of the prior baggage cart is so constructed that the inner tubes can be locked only on an uppermost locking position of the outer tubes but cannot be locked on intermediate positions thereof, the length of the prior handle assembly cannot be adjusted to and fixedly locked in a desired position along the length of the outer tubes.

SUMMARY OF THE INVENTION

It is therefore an objective of the present invention to provide a new and improved handle assembly for a baggage cart. The length of the present handle assembly can be adjusted to and fixedly locked in a desired position along the length of the outer tubes.

The present invention provides a handle assembly for a baggage cart which is integrated with a case and has a handle for a user to grip. The present handle assembly comprises an outer tube means which is fixedly mounted onto the case and is provided with locking holes along its length, an inner tube means connected to the handle, and having at least a park located within the outer tube means with a telescopic movement in relation to the outer tube means, an operating means which is movably mounted onto the inner tube means and is operated between a first position and a second position, an operating sleeve which is fixedly connected to the inner tube means and has holes formed in its wall, steel balls which are movably received within the holes of the operating sleeve, and a plunger which has a flange surface, being fixedly connected to the operating means and being movably mounted within the operating sleeve, wherein when the operating means is operated to the first position and the holes of the operating sleeve are aligned with the locking holes, the flange surface contacts with the steel balls and forces at least parts of the steel balls to fixedly engage with the locking holes of the outer tube means, and when the operating means is operated to the second position, the flange surface no longer contacts the steel balls and the engagement between the steel balls and the locking holes of the outer tube means is released.

It is an object of the present invention to provide a handle assembly for a baggage cart wherein the length of the handle assembly is adjustable and can be fixedly locked along the length of the outer tube.

It is a further object of the present invention to provide a length-adjustable handle assembly for a baggage cart wherein the length of the handle assembly can be easily adjusted.

It is still another object of the present invention to provide a length-adjustable handle assembly for a baggage cart, which has a simply construction and a low manufacturing cost.

Other objects, advantages, and novel features of the invention will become more apparent from the following detailed description When taken in conjunction with the accompanying drawings.

DETAILED DESCRIPTION OF THE PREFERRED EMBODIMENTS

Figure 1:
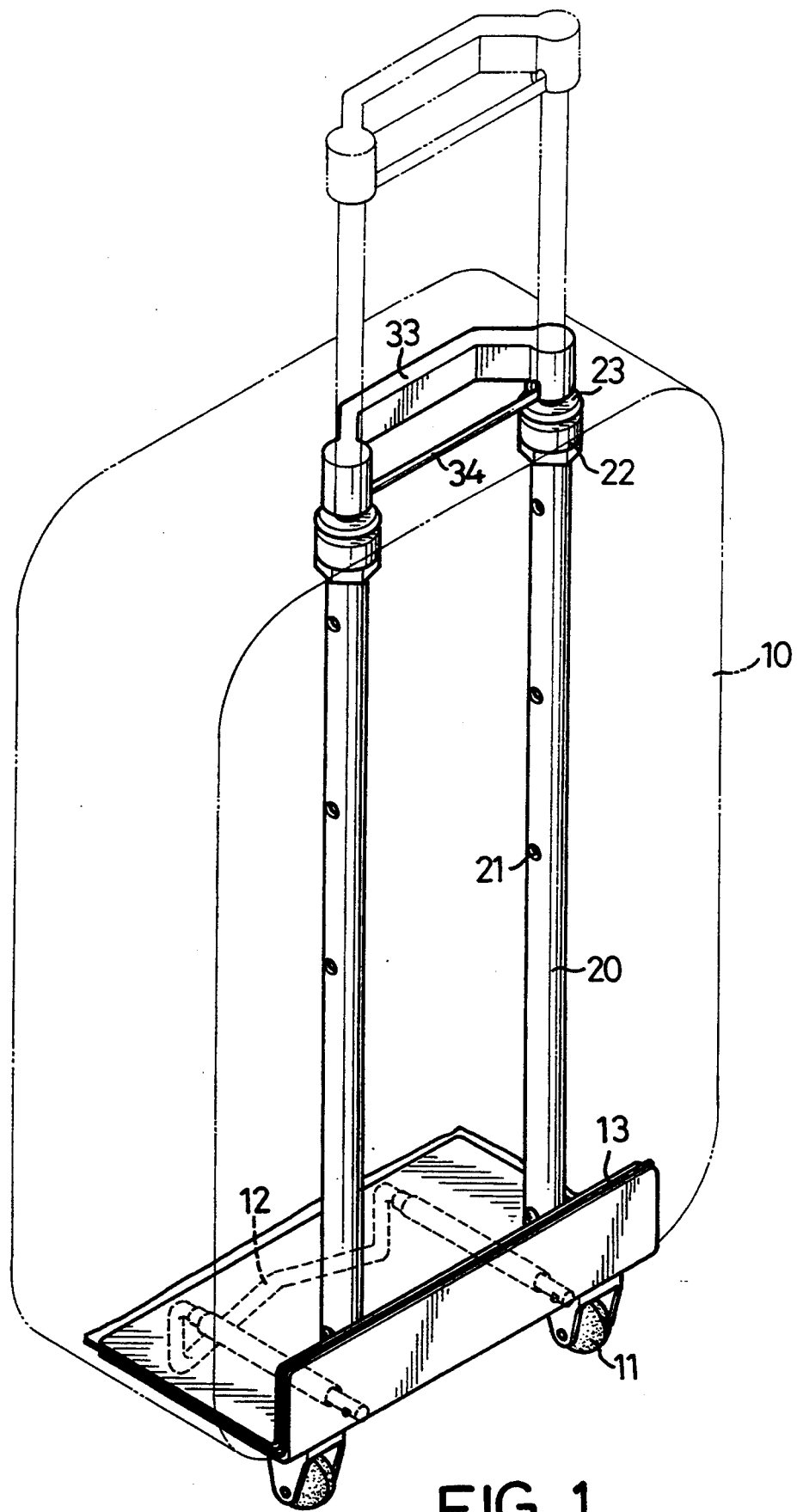
FIG. 1 is a perspective view showing that the present length-adjustable handle assembly is installed in a baggage cart wherein there are phantom lines which show the condition that the handle is extended and other phantom lines which show a case.

Referring to FIG. 1, a baggage cart conventionally comprises a case 10 (indicated by phantom lines), a bracket 12 (indicated by dashed lines) used for supporting the cart when the cart is stopped, roller wheels 11 for the movement of the cart and an L-shaped bottom plate 13 to enforce the stiffness of the cart.

Upper ends of the outer tubes 20 are installed onto the case 10 by the incorporation of mounting caps 23 and mounting sleeves 22, wherein each outer tube 20 has three locking holes 21 along its length. The details of the installation of the upper ends of the outer tubes 20 onto the case 10 will be more clearly illustrated by FIGS. 3 and 4. A handle 33 and an operating bar 34 are installed above the outer tubes 20.

Figure 2:
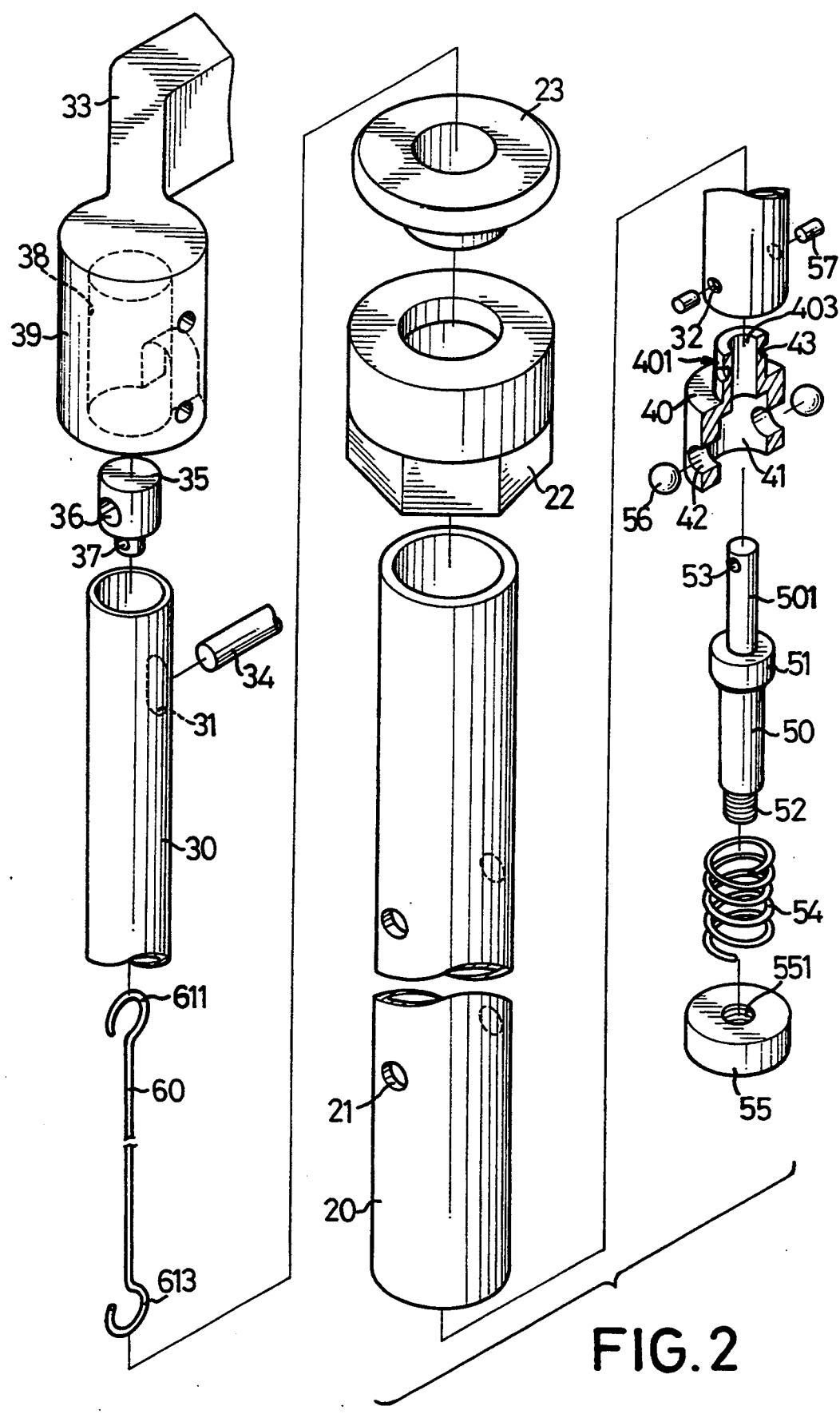
FIG. 2 is a perspective exploded view showing the components constituting the present length-adjustable handle assembly.

Now please refer to FIG. 2. FIG. 2 is an exploded perspective view showing the components constituting a part of the present length-adjustable handle assembly, which includes a handle 33 having a cylindrical end portion 39 with a cylindrical recess 38 for fixedly receiving an upper end portion of an inner tube 30, an operating block 35 with two holes 36 and 37, an elongate opening 31 formed on the upper end portion of the inner tube 30 and two holes 32 formed on the lower end portion thereof, an operating bar 34, a connecting wire 60 with an upper hook 611 and a lower hook 613, a mounting cap 23, a mounting sleeve 22, an outer tube 20 with a plurality of locking holes 21 formed on its wall and along its length, two pins 57, an operating sleeve 40 with two holes 42 for receiving two steel balls 56, a plunger 50 with a lower threaded end 52, a spring 54 and a stop 55 with a threaded hole 551 to be threadedly engaged with the threaded end 52 of the plunger 50.

Figure 3:
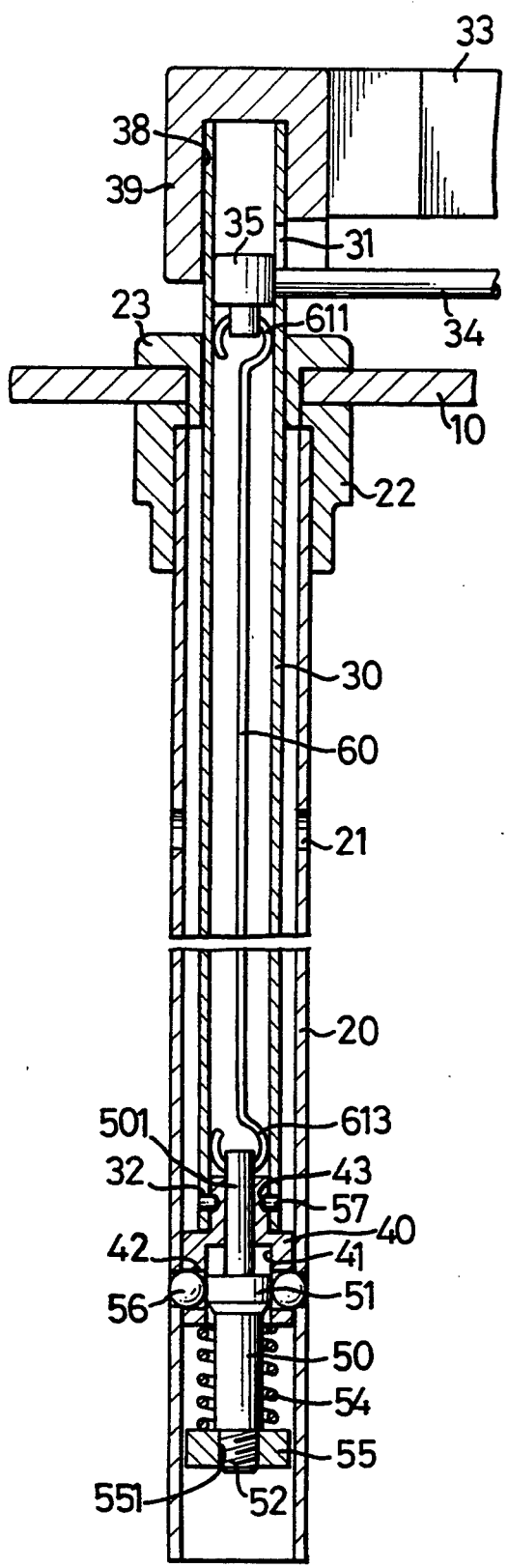
FIG. 3 is a cross sectional view showing that the present handle assembly is retained in one of its locking positions.

Now please refer simultaneously to FIG. 2, and FIG. 3 which shows a left section of the present length-adjustable handle assembly in an assembled state and fixedly locked by means of the steel balls 56 in the shown locking holes 21. The upper end of the outer tube 20 is integrated with the mounting sleeve 22. The mounting cap 23 and the mounting sleeve 22 are assembled together by a known manner, for example, by a heavy force fit, and they incorporatively form an annular space therebetween. The annular space fixedly receives a part of the case 10 therewithin by simultaneously compressing and gluing the shown part of the case 10 between and with the mounting cap 23 and the mounting sleeve 22. Thus, the upper end of the outer tube 20 can be fixedly installed onto the case 10. The operating bar 34 passes through the elongate opening 31 of the inner tube 30 and is fixedly inserted into the hole 36 (FIG. 2) of the operating block 35 which is movably mounted within the inner tube 30. The connecting wire 60 is fixedly connected between the operating block 35 and the plunger 50 by passing its upper hook 611 through the hole 37 (FIG. 2) of the operating block 35 and its lower hook 613 through a hole 53 of the plunger 50 (FIG. 2). The operating sleeve 40 is fixedly connected to the inner tube 30 by the pins 57 which fixedly engage with the holes 32 of the inner tube 30 and depressions 43 formed on an upper portion 401 (FIG. 2) of the operating sleeve 40. An upper portion 501 of the plunger 50 extends through a hole 403 formed on an upper portion of the operating sleeve 40. A portion of the plunger, which includes the flange surface 51, is movably mounted within a recess 41 of the operating sleeve 40. The spring 54 is mounted and compressed between the bottom surface of the operating sleeve 40 and the stop 55, and surrounds a lower portion of the plunger 50.

As shown by FIG. 3, the flange surface 51 abuts against the steel balls 56 and forces the steel balls 56 to enter and fixedly engage with the shown locking holes 21 of the outer tube 30; thus, the inner tube 30 can be fixedly locked in the shown position by the fixed engagement between the steel balls 56 and the shown locking holes 21.

Figure 4:
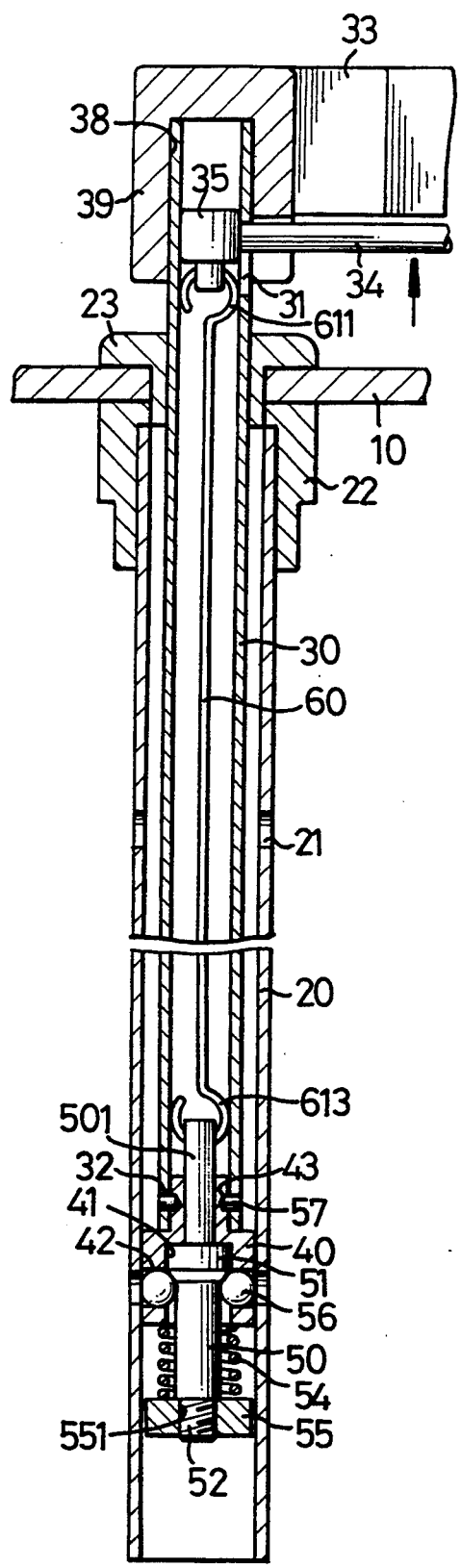
FIG. 4 is a view similar to FIG. 3 but showing that the present handle assembly is activated to lift the inner tube from the outer tube.

Referring to FIG. 4 which shows the operating bar 34 activated to release the locking situation of FIG. 3, when a user wants to adjust the length of the handle assembly, he simply pulls the operating bar 34 upwards, as shown by the arrow. Since the operating bar 34 is fixedly connected to plunger 50 via the operating block 35 and connecting wire 60, an upward movement of the operating bar 34 will cause a lifting movement of the plunger 50 until the periphery of the operating bar 34 contacts the upper edge of the elongate opening 31 of the inner tube 30. The upward movement of the plunger 50 causes the flange surface 51 to no longer be in contact with the steel balls 56; thus, the steel balls 56 will not be forced to enter and engage with the shown locking holes 21, whereby the locking situation is released and the inner tube can be pulled upwardly by a pulling force acting on the handle 33. Then, the user can pull the handle 33 upwardly to the desired locking position and then release the upward action of the operating bar 34. Once the upward force acting on the operating bar 34 is released, the compression force of the spring 54 will act on the stop 55 which in turn pulls the plunger 50 downwardly. Thus, when the holes 42 of the operating sleeve 40 are moved to be in alignment with the desired locking holes 21 of the outer tube 20, the flange surface 51 will again contact with the steel balls 56 and force them to enter and fixedly engage with the desired locking holes 21, whereby the length of the present handle assembly can be adjusted to and fixedly locked in the desired position.

Although the invention has been explained in relation to its preferred embodiment, it is to be understood that many other possible modifications and variations can be made without departing from the spirit and scope of the invention as hereinafter claimed.

I claim:

1. A handle assembly for a baggage cart which is integrated with a case and has a handle for a user to grip, comprising:

an outer tube means being fixedly mounted onto the case and being provided with a plurality of locking holes along its length;

an inner tube means fixedly connected to the handle and telescopically received within the outer tube means;

an operating means being movably mounted onto the inner tube means and operated between a first position and a second position;

an operating sleeve being fixedly connected to the inner tube means and having holes defined in its wall;

balls being movably received within the holes of the operating sleeve;

a plunger having a flange surface, the plunger being fixedly connected to the operating means and being movably mounted within the operating sleeve, wherein when the operating means is operated to the first position and the holes of the operating sleeve are aligned with the locking holes, the flange surface contacts with the balls and forces at least parts part of the balls to fixedly engage with the locking holes of the outer tube means, and when the operating means is operated to the second position, the flange surface no longer contacts the balls and the engagement between the balls and the locking holes of the outer tube means is released; and force generating means for generating a force applied to the operating means in a direction opposite to the moving direction of the operating means when the operating means is operated from the first position to the second position, wherein the force generating means comprises a stop fixedly connected the operating means and a spring located and compressed between the stop and the operating sleeve and surrounding a lower portion of the plunger.

2. A handle assembly according to claim 1, wherein the outer tube means has an upper end portion integral with a mounting sleeve which incorporates with and fixedly connects to a mounting cap to form an annular space which fixedly receives a part of the case therewithin, thereby to fixedly mount the upper end portion of the outer tube means onto the case.

* * * * *